United States Patent
Agrawal et al.

(10) Patent No.: US 11,507,266 B1
(45) Date of Patent: Nov. 22, 2022

(54) MEDIA CAPTURE BASED ON MEDIA SPECIFICATIONS

(71) Applicant: Motorola Mobility LLC, Chicago, IL (US)

(72) Inventors: Amit Kumar Agrawal, Bangalore (IN); Boby Iyer, Elmhurst, IL (US); Fabio Felipe Mira Machuca, Santo Antônio Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/462,560

(22) Filed: Aug. 31, 2021

(51) Int. Cl.
*G06F 3/04847* (2022.01)
*G06F 16/16* (2019.01)
*G06F 3/0482* (2013.01)

(52) U.S. Cl.
CPC ........ *G06F 3/04847* (2013.01); *G06F 3/0482* (2013.01); *G06F 16/168* (2019.01)

(58) Field of Classification Search
CPC ... G06F 3/04847; G06F 16/168; G06F 3/0482
See application file for complete search history.

(56) References Cited

U.S. PATENT DOCUMENTS

| | | | |
|---|---|---|---|
| 2013/0155474 A1* | 6/2013 | Roach | G06Q 20/387 358/473 |
| 2018/0210960 A1* | 7/2018 | Maycock | G06F 16/24578 |
| 2018/0348992 A1* | 12/2018 | Ku | H04N 21/47217 |
| 2021/0400171 A1* | 12/2021 | Zhao | H04N 5/2352 |

OTHER PUBLICATIONS

"How to capture a custom image size with the camera in android?", in: Stack Overflow [online][retrieved Jul. 16, 2021], Retrieved from the Internet <https://stackoverflow.com/questions/5774872/how-to-capture-a-custom-image-size-with-the-camera-in-android?answertab=active#tab-top>., Apr. 25, 2011, 3 Pages.

"Image Size—Photo Resizer", Google Play [retrieved Jul. 16, 2021], Retrieved from the Internet <https://play.google.com/store/apps/details?id=de.vsmedia.imagesize&hl=en>., Dec. 13, 2016, 3 Pages.

* cited by examiner

*Primary Examiner* — Maryam M Ipakchi
(74) *Attorney, Agent, or Firm* — FIG. 1 Patents (57) ABSTRACT

Techniques for media capture based on media specifications are described and are implementable to enable media content to be captured and/or obtained in compliance with particular media specifications. The described implementations, for example, utilize specified media specifications (e.g., media constraints) to be utilized as part of a media capture process. For instance, default media capture settings of a media capture device are modified to enable the media capture device to capture an instance of media content that complies with specific media specifications.

20 Claims, 8 Drawing Sheets

MEDIA CAPTURE BASED ON MEDIA SPECIFICATIONS

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. In interacting with devices user's often encounter scenarios where input of an instance of media content is available. For instance, a user can provide instances of media content to particular applications for various purposes. A social media application, for example, can receive digital photos from a user for publication. In another example, an enterprise application can provide an input field that can receive an image of a user signature for authorizing a particular action.

Current implementations for media content input, however, demonstrate a number of drawbacks. For instance, current digital cameras implemented in a typical device (e.g., a smartphone) capture high-quality images at increasing levels of resolution. However, many applications have memory and/or aspect ratio limitations such that a typical captured digital image is not usable unless some form of post processing is applied to reduce file size and/or image size. Thus, in many scenarios a user is required to capture an instance of media content and then apply post-capture processing to the media content to conform to media specifications of a particular application. This not only causes user frustration but wastes system resources (e.g., processor bandwidth, memory, network bandwidth) required to apply the post processing to the media content. Further, many users are inexperienced in digital media editing and thus their attempts to edit media to meet media specifications may result in media that still does not comply with particular media specifications and/or poor quality media.

BRIEF DESCRIPTION OF THE DRAWINGS

Aspects of media capture based on media specifications are described with reference to the following Figures. The same numbers may be used throughout to reference similar features and components that are shown in the Figures. Further, identical numbers followed by different letters reference different instances of features and components described herein.

DETAILED DESCRIPTION

Techniques for media capture based on media specifications are described and may be implemented to enable media content to be captured and/or obtained in compliance with particular media specifications. Generally, the described implementations utilize specified media specifications (e.g., media constraints) to be utilized as part of a media capture process and in at least some implementations do not utilize post processing to enable compliance with stated media specifications. This provides for greater automation and user convenience than is provided by traditional techniques for obtaining media content.

For instance, consider a scenario where an application operating on a computing device is configured to receive media input. A particular application, for example, presents a prompt for inputting a digital image, such as a user photo for a user profile (e.g., for a social media application), an image of a user's signature (e.g., to authorize a particular document and/or action), an image of a visual object (e.g., an image of a house for a real estate application), and so forth. Further, the application implements specific media specifications (e.g., constraints) for digital image input, such as maximum file size, maximum resolution, maximum image size, aspect ratio (e.g., 16:9, 4:3), image orientation (e.g., landscape, portrait), etc. Accordingly, to enable a digital image to be obtained that complies with the media specifications, the described system automatically identifies the media specifications and causes an image capture device (e.g., a camera) to obtain a digital image in compliance with the media specifications. For instance, default image capture settings of the image capture device are modified such that a captured image does not exceed media constraints specified by the media specifications. In at least one implementation this enables a captured digital image to be input to the application without utilizing post processing to modify the capture image to comply with the media specifications.

In an alternative or additional implementation media specifications for an application are utilized to obtain media content that complies with media specifications from a group of existing media content. For instance, in a digital image scenario, media specifications for the application can specify media constraints, and may also specify image content (e.g., visual objects) to be included in a digital image. Accordingly, the media specifications are utilized to perform an automated search of a group of digital images to identify a particular digital image that complies with the media specifications, e.g., media constraints and/or a specified visual object. The particular digital image can then be provided as input to the application for various purposes.

Generally, the described techniques enable media content to be automatically obtained (e.g., captured and/or identified) in compliance with media specifications and without requiring manual interactions to modify media content to comply with media specifications. While the examples above are discussed with reference to visual media content, the described techniques can be utilized to obtain various types of media content in compliance with media specifications, such as digital video, digital audio, etc.

Accordingly, the described techniques are automated and are able to obtain media content in compliance with media specifications without user interaction to obtain media specifications and/or to modify media content to comply with media specifications.

While features and concepts of media capture based on media specifications can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

Figure 1:
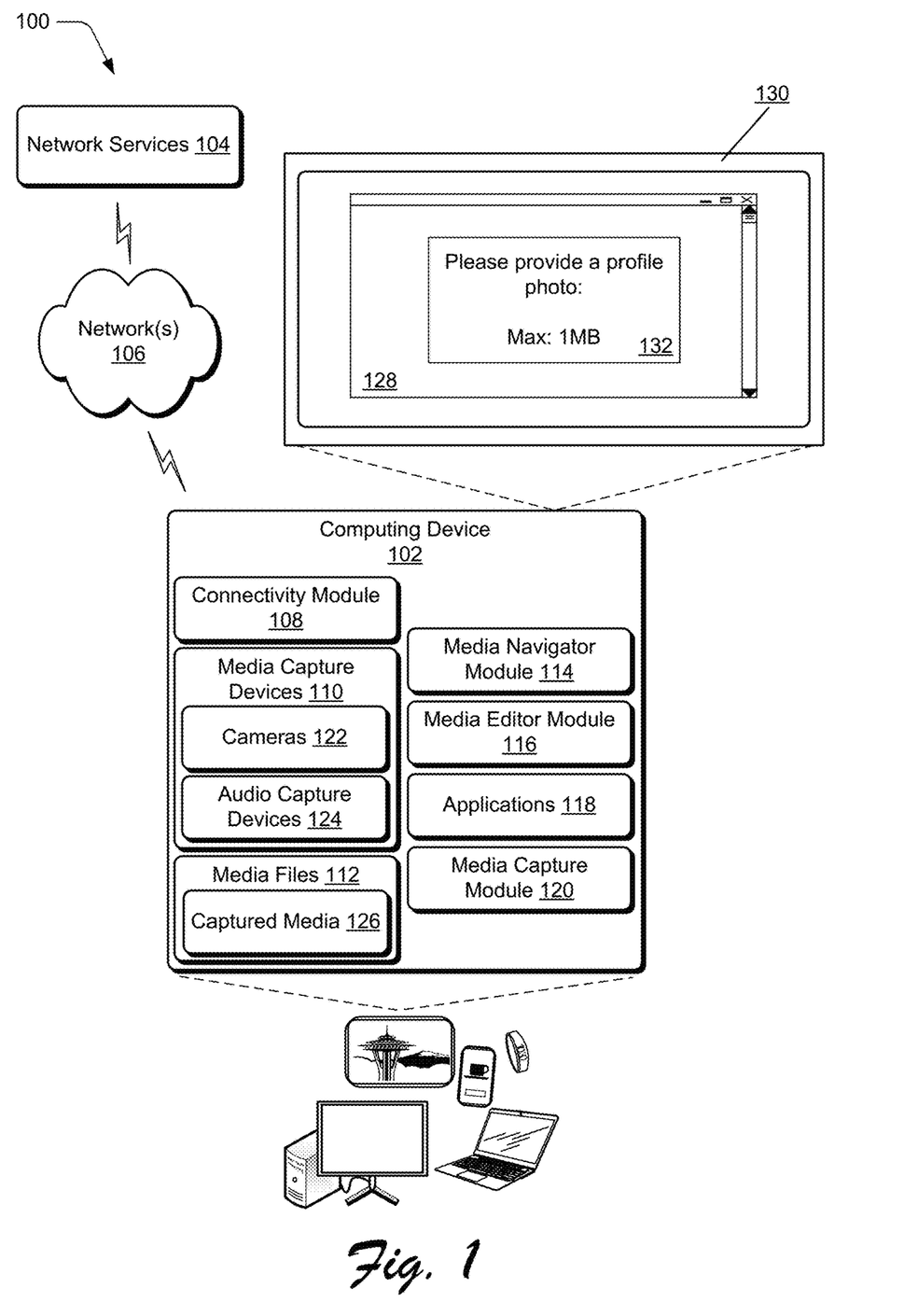
FIG. 1 illustrates an example environment in which aspects of media capture based on media specifications can be implemented.

FIG. 1 illustrates an example environment 100 in which aspects of media capture based on media specifications can be implemented. The environment 100 includes a computing device 102 and network services 104 that are interconnectable in various ways such as via connectivity to a network 106. The computing device 102 and the network services 104, for instance, are interconnectable via wireless and/or wired connectivity to the network 106. Generally, the computing device 102 can be implemented in various ways and according to various form factors such as a smartphone, tablet device, a laptop computer, a desktop computer, a wearable computing device, and so forth.

The computing device 102 includes various functionality that enables the computing device 102 to perform different aspects of media capture based on media specifications discussed herein, including a connectivity module 108, media capture devices 110, media files 112, a media navigator module 114, a media editor module 116, applications 118, and a media capture module 120. The connectivity module 108 represents functionality (e.g., logic and hardware) for enabling the computing device 102 to interconnect with other devices and/or networks, such as the network 106 and the network services 104. The connectivity module 108, for instance, enables wireless and/or wired connectivity of the computing device 102. In a wireless scenario the connectivity module 108 enables connectivity and data communication via a variety of different wireless protocols, such as wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth The media capture devices 110 are representative of functionality to enable various types of media to be captured via the computing device, such as visual media and audio media. In this particular example the media capture devices 110 include cameras 122 and audio capture devices 124. The media capture devices 110, however, can include a variety of other devices that are able to capture various types of media in accordance with the implementations discussed herein. Generally, the media capture devices 110 include not only hardware for capturing associated media but also logic (e.g., drivers, firmware, etc.) for operating and configuring operation of the associated media capture devices 110.

The media files 112 represent instances of different digital media stored by and/or available to the computing device 102. For instance, the media files 112 can be stored locally on the computing device 102 and/or obtained from a network service 104. Examples of the media files 112 include digital images, digital video, digital audio, and combinations thereof. The media files 112, for instance, include captured media 126 which represent instances of digital media captured by the media capture devices 110. The media navigator module 114 represents functionality for navigating through and/or selecting instances of media files 112. For instance, the media navigator module 114 exposes functionality that enables a user to navigate through and select instances of the media files. Further, the media navigator module 114 includes automated functionality for identifying and/or selecting instances of media files 112 based on various selection criteria, such as media type, file size, media content, various media characteristics (e.g., visual and/or audible characteristics), and so forth.

The media editor module 116 represents functionality for editing digital media, such as instances of the media files 112. For instance, the media editor module 116 is operable as an image editor for editing characteristics of visual media files (e.g., digital images, digital video), as an audio editor for editing characteristics of audio files (e.g., audio attributes), and so forth. The applications 118 represent functionality for performing different computing tasks via the computing device 102, such as gaming, media consumption (e.g., content streaming), productivity tasks (e.g., word processing, content generation, data analysis, etc.), ecommerce, enterprise tasks, content generation, web browsing, communication with other devices, and so forth. Generally, the applications 118 can be implemented in various ways, such as applications stored on and executed by the computing device 102, network-based applications that expose functionality via the computing device 102, and so forth.

The media capture module 120 represents functionality for performing various aspects of media capture based on media specifications described herein such as for enabling media content that meets various criteria to be captured and/or selected. For instance, consider that an application 118 presents an application graphical user interface (GUI) 128 on a display device 130 of the computing device 102. Further, the application GUI 128 includes a media prompt 132 that indicates that the application 118 is configured to receive input of media content. Generally, input of media content to the application 118 is based on different media specifications, such as constraints on file size and/or other media attributes. Further, the application 118 can request specific media content to be included in media content to be input to the application 118. Accordingly, the media capture module 120 ascertains the media specifications and enables content that complies with the media specifications to be obtained and input to the application 118, such as via content capture by a media capture device 110 and/or via identifying an instance of media content from the media files 112.

The network services 104 represent different network-accessible services that are accessible by the computing device 102 for various purposes. Examples of the network services 104 include websites, web-based services, cloud services, network-based enterprise services, and so forth. In at least one implementation the network services 104 implement instances of the applications 118 that enable interaction with respective network services 104. For example, the computing device 102 accesses various network services 104 via interaction with respective applications 118.

Having discussed an example environment in which the disclosed techniques can be performed, consider now some example scenarios and implementation details for implementing the disclosed techniques.

Figure 2A:
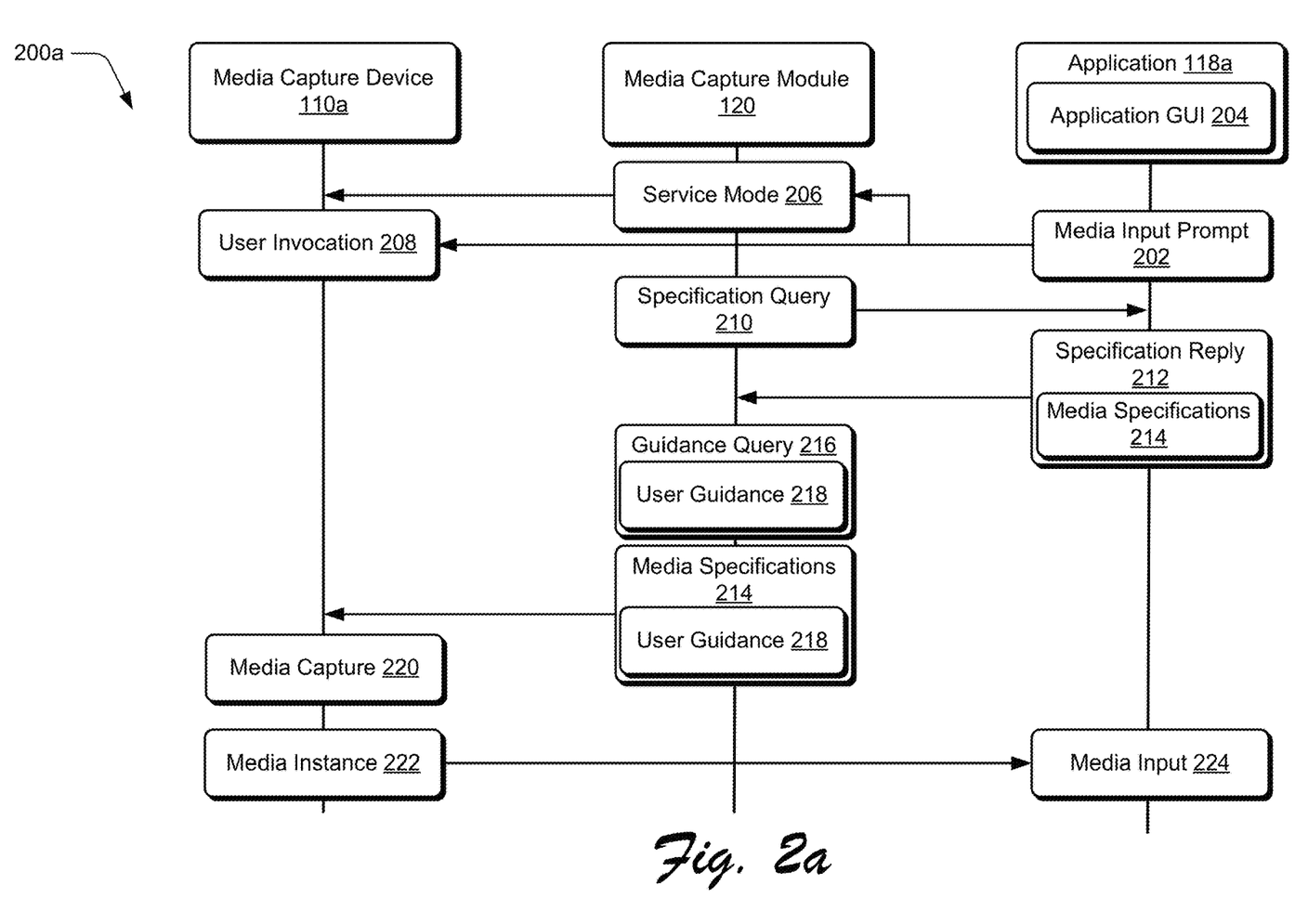
FIG. 2*a* depicts an example system for capturing media content based on media specifications in accordance with one or more implementations.

FIG. 2a depicts an example system 200a for capturing media content based on media specifications in accordance with one or more implementations. Generally, the system 200a can be implemented in the environment 100 and incorporates attributes of the environment 100 introduced above. In the system 200a an application 118a initiates a media input prompt 202 indicating that the application 118a is in a media input mode where the application 118a is configured to receive input of media content. In at least one implementation the media input prompt 202 is based on an application graphical user interface (GUI) 204 for the application 118a that includes a media input functionality, such as a media input field for providing media input to the application 118a. Generally, the media input prompt 202 can occur in various ways. For instance, the application 118a generates the media input prompt 202 automatically and based on implementing functionality of the application 118a for receiving media input.

In at least one implementation the media input prompt 202 causes a media capture device 110a to be invoked as part of a service mode 206 to enable the media capture device 110a to capture media content for the application 118a. The media capture module 120, for instance, detects the media input prompt 202 and invokes the service mode 206 to request that the media capture device 110a capture media content for the application 118a. In at least one implementation the service mode 206 is implemented via an application programming interface (API) that enables interaction between the media capture module 120 and the media capture device 110a, such as for requesting that instances of media content be captured. The service mode 206, for instance, causes the media capture module 120 to automatically launch the media capture device 110a for capturing media content based on the media input prompt 202. In at least one implementation invoking the service mode 206 is optional. For instance, in an alternative implementation, the media input prompt 202 includes a user prompt to capture an instance of media content, such as a visual prompt and/or an audible prompt. The application GUI 204, for example, includes a prompt for a user to capture an instance of media content for input to the application 118a. Accordingly, in such scenarios, a user invocation 208 of the media capture device 110a is implemented such as via manual user input to the computing device 102 to launch the media capture device 110a. Generally, the media capture device 110a represents an instance and/or instances of the media capture devices 110, such as a camera 122 and/or an audio capture device 124.

Accordingly, in response to detecting the media input prompt 202, the service mode 206, and/or the user invocation 208, the media capture module 120 communicates a specification query 210 to the application 118a. The specification query 210, for instance, queries for media specifications for providing an instance of media content for the application 118a. For instance, in an implementation where the media input prompt 202 is based on visual media input (e.g., digital images, digital video), the specification query 210 requests media specifications for image media to be input to the application 118a. In an implementation where in the media input prompt 202 is based on audio input media (e.g., voice media and/or other audible media) the specification query 210 request media specifications for audio media to be input to the application 118a.

Based on the specification query 210 the application 118a generates a specification reply 212 that specifies media specifications 214 for providing an instance of media content to the application 118a. In an alternative or additional implementation the application 118a communicates the media specifications 214 independently (e.g., without) the specification query 210. Generally, the media specification specifications 214 can include various types and instances of media specifications, such as media constraints including maximum and/or minimum values for media content to be input to the application 118a. For instance, where the media input prompt 202 is based on visual media content (e.g., a digital image and/or digital video) the media specifications 214 include specifications for digital visual media such as maximum file size, maximum or minimum media resolution, target aspect ratio, a maximum, and/or minimum bitrate, supported image and/or video compression protocol(s), etc. In an alternative or additional example where the media input prompt 202 is based on audio media content the media specifications 214 include specifications for audio media such as maximum file size, a specified maximum bitrate, maximum audio content duration, supported audio compression protocol(s), etc.

Further to the system 200a the application 118a communicates the specification reply 212 with the media specifications 214 to the media capture module 120. In an alternative or additional implementation the media capture module 120 determines the media specifications 214 based on inspecting attributes of the application 118a. For example, the application GUI 204 includes an indication of the media specifications 214, such as visual and/or text content that identifies the media specifications 214. The application GUI 204, for instance, identifies media specifications for input of media content to the application 118a. Accordingly, the media capture module 120 can implement an analysis of the application GUI 204 (e.g., via text recognition) to recognize the media specifications 214 specified by the application GUI 204. Thus, the media specifications 214 can be identified in various ways, such as via express communication from the application 118a (e.g., the specification reply 212), via inference based on content generated by the application 118a (e.g., inspection of the application GUI 204), and so forth.

In an optional implementation the media capture module 120 provides a user option to provide input to affect how the media specifications 214 are utilized to capture media content. For instance, the media capture module 120 presents a guidance query 216 that queries a user to select whether to provide guidance for applying the media specifications. The guidance query 216, for example, provides a user option to provide guidance on applying the media specifications 214 and a user option to forego providing such guidance. Accordingly, in an implementation where a user selects to provide input on applying the media specifications, user input to specify user guidance 218 is received based on the guidance query 216, such as to a graphical user interface presented as part of the guidance query 216.

Continuing with the system 200a the media capture module 120 communicates the media specifications 214 and optionally the user guidance 218 to the media capture device 110a. Accordingly, the media capture device 110a performs a media capture 220 based on the media specifications 214 and optionally the user guidance 218 to generate a media instance 222. The media capture device 110a, for example, configures capture settings to comply with the media specifications 214 and optionally the user guidance 218 and in response to user input to invoke a media capture event, the media capture device 110a capture the media instance 222 to comply with the media specifications 214 and optionally the user guidance 218. In at least one implementation the media capture device 110a modifies its default capture settings based on the media specifications 214 and optionally the user guidance 218 to enable the media capture device 110a to capture the media instance 222 to in compliance with the media specifications 214. The media instance 222, for example, is based on a media type specified by the media input prompt 202 and complies (e.g., does not exceed) the media specifications 214. The media capture device 110*a* communicates the media instance 222 to the application 118*a* and the application 118*a* utilizes the media instance 222 as media input 224. In at least one implementation the application 118*a* is able to utilize the media instance 222 as the media input 224 without media post processing being applied to the media instance 222 after the media capture 220.

Figure 2B:
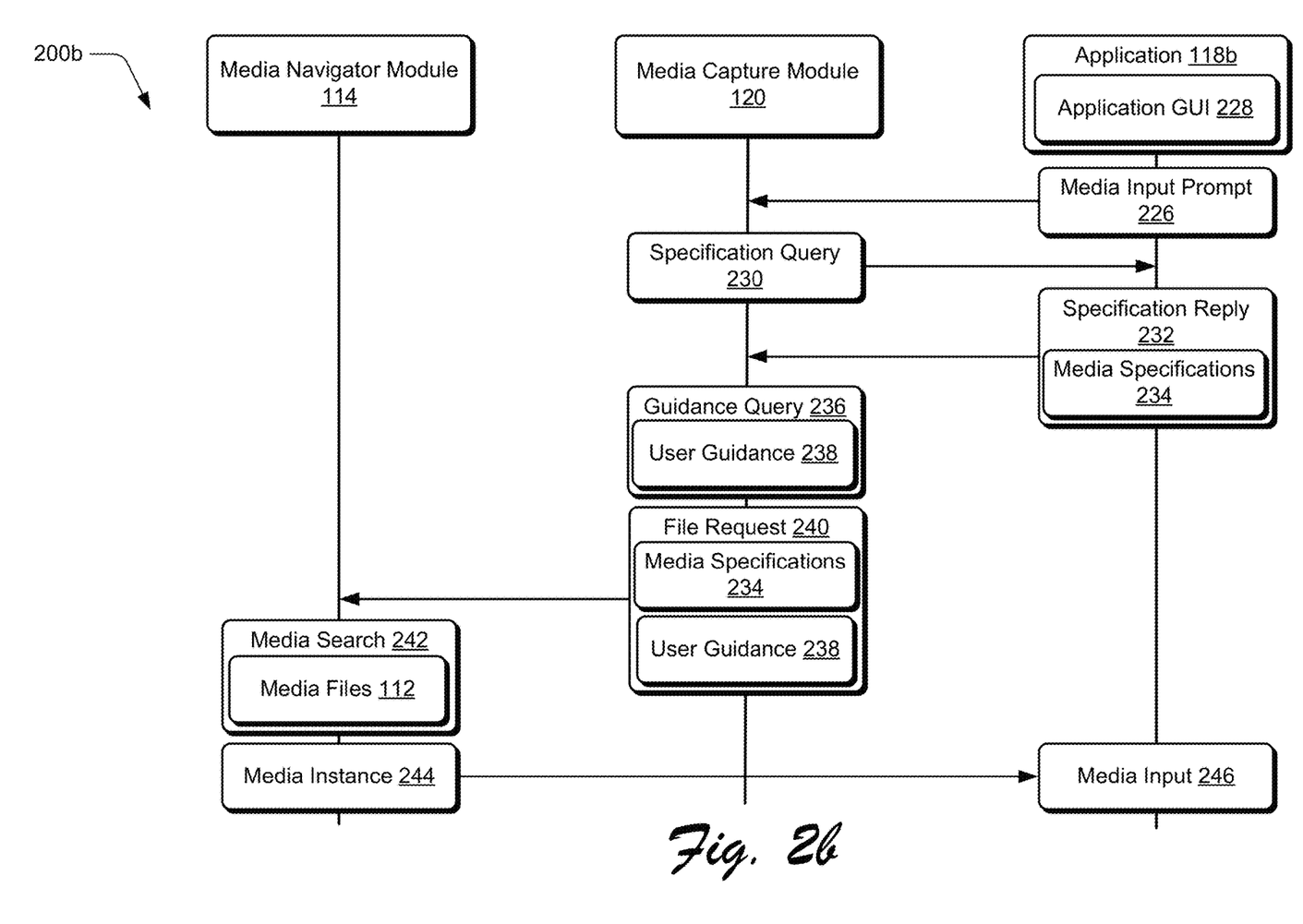
FIG. 2*b* depicts an example system for selecting instances of media content based on media specifications in accordance with one or more implementations.

FIG. 2*b* depicts an example system 200*b* for selecting instances of media content based on media specifications in accordance with one or more implementations. Generally, the system 200*b* can be implemented in the environment 100 and incorporates attributes of the environment 100 introduced above. In the system 200*b* an application 118*b* initiates a media input prompt 226 indicating that the application 118*b* is in a media input mode where the application 118*b* is configured to receive input of media content. In at least one implementation the media input prompt 226 is based on an application graphical user interface (GUI) 228 for the application 118*b* that includes a media input functionality, such as a media input field for providing media input to the application 118*b*. Generally, the media input prompt 226 can occur in various ways. For instance, the application 118*b* generates the media input prompt 226 automatically and based on implementing functionality of the application 118*b* for receiving media input.

Further to the system 200*b* the media capture module 120 detects the media input prompt 226 and determines that a media file is to be obtained for the application 118*a*. For instance, the application 118*b* does not invoke a media capture device 110 for capturing media content and thus the media capture module 120 determines that a media file 112 is to be selected. Accordingly, the media capture module 120 generates a specification query 230. The specification query 230, for instance, queries for media specifications for providing an instance of media content for the application 118*b*. Different examples of media specifications for different media types are discussed throughout this disclosure. The media capture module 120 communicates the specification query 230 to the application 118*b* and the application 118*b* generates a specification reply 232 that specifies media specifications 234 for providing media content to the application 118*b*. In an alternative or additional implementation the application 118*b* communicates the media specifications 234 independently of (e.g., without) a specification query 230. As described throughout the media specifications 234 can include constraints on attributes of media content such as file size, resolution, bitrate, etc. The media specifications 234 can also include specific attributes of media content, such as visual and/or audio features of instances of media content. For visual media content, for example, the media specifications 234 can specify particular image features to be included in media content such as specific persons (e.g., images of a user of the computing device 102, persons related to the user, friends of the user, etc.), specific locations (e.g., geographic locations), specific objects (e.g., animals, geographic features, etc.), and so forth. For audio content the media specifications 234 can specify attributes of audio content such as speech audio from a particular person (e.g., a user of the computing device 102), audio content including particular keywords, audio content of a particular playback length, and so forth.

Further to the system 200*b* the application 118*b* communicates the specification reply 232 with the media specifications 234 to the media capture module 120. In an optional implementation the media capture module 120 provides a user option to provide input to affect how the media specifications 234 are utilized to select media content. For instance, the media capture module 120 presents a guidance query 236 that queries a user to select whether to provide guidance for selecting a media file based on the media specifications 234. The guidance query 236, for example, provides a user option to provide guidance on utilizing the media specifications 234 and a user option to forego providing such guidance. Accordingly, in an implementation where a user selects to provide input on utilizing the media specifications 234, user input to specify user guidance 238 is received based on the guidance query 236, such as to a graphical user interface presented as part of the guidance query 236.

Continuing, the media capture module 120 generates a file request 240 that includes the media specifications 234 and optionally the user guidance 238. The file request 240, for instance, includes a request for a particular instance of media content (or multiple instances of media content) of a particular content type indicated by the media input prompt 226, the media specifications 234 for selecting an instance of media content, and optionally the user guidance 238. In an alternative or additional implementation the media capture module 120 determines the media specifications 234 based on inspecting attributes of the application 118*b*. For example, the application GUI 228 includes an indication of the media specifications 234, such as visual and/or text content that identifies the media specifications 234. The application GUI 228, for instance, identifies media specifications for input of media content to the application 118*b*. Accordingly, the media capture module 120 can implement an analysis of the application GUI 228 (e.g., via text recognition) to recognize the media specifications 234 specified by the application GUI 228. Thus, the media specifications 234 can be identified in various ways, such as via express communication from the application 118*b* (e.g., the specification reply 232), via inference based on content generated by the application 118*b* (e.g., inspection of the application GUI 228), and so forth.

Further to the system 200*b* the media capture module 120 communicates the file request 240 with the media specifications 234 and optionally the user guidance 238 to the media navigator module 114 and the media navigator module 114 executes a media search 242 of the media files 112 based on the media specifications 234 and optionally the user guidance 238 to identify a media instance 244 that corresponds to the media specifications 234. The media navigator module 114, for instance, utilizes the media specifications 234 and optionally the user guidance 238 to search the media files 112 and identify media files that correspond to the media specifications 234, such as media files that correspond to specified media constraints (e.g., file size, image size, etc.) and/or media files that include media attributes specified by the media specifications 234. As mentioned above the media files 112 can reside locally on the computing device 102 and/or on a network resource such as the network services 104, and thus the media search 242 can include a local search on the computing device 102 for an instance of media content and/or a remote search of a network service 104 (e.g., a cloud-based media storage) for an instance of media content. Accordingly, the media instance 244 is identified as correlating to the media specifications 234, and the media navigator module 114 provides the media instance 244 to the application 118*b*. The application 118*b* utilizes the media instance 244 as media input 246 to the application 118*b* for various purposes.

Generally, the system 200b is implementable based on different state conditions, such as in scenarios where the application 118b does not automatically invoke a media capture device 110 (e.g., as described in the system 200a), where a media capture device 110 is not currently available and/or functional, where a user specifies that an existing media file is to be selected for input to the application 118b, and so forth. Further, while the systems 200a, 200b are discussed with reference to selecting single instances of media content, it is to be appreciated that the systems are also implementable to select groups of media instances that comply with media specifications, such as individually and/or as a group.

Figure 3A:
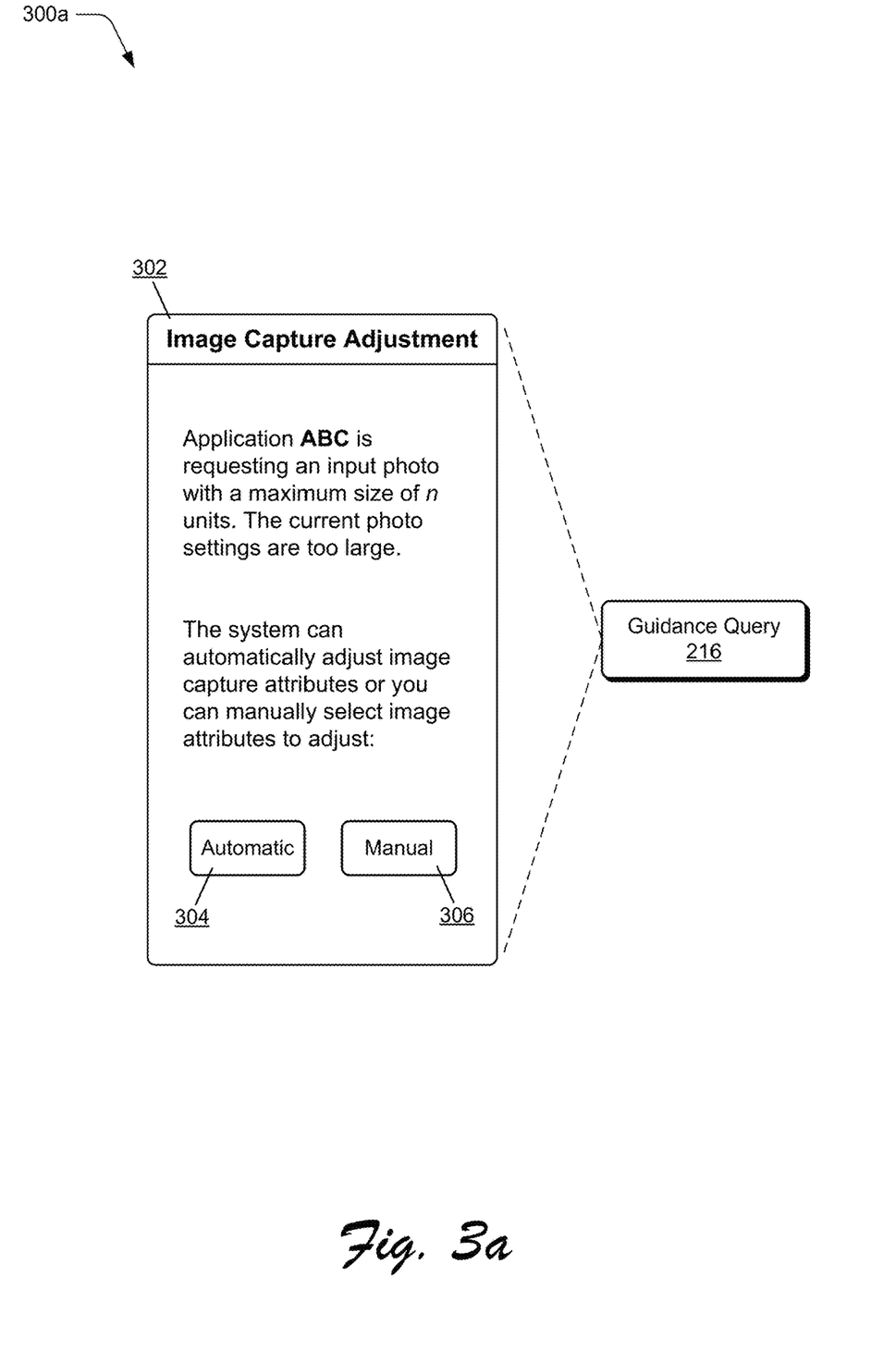
FIG. 3*a* depicts a scenario for enabling user interaction for determining how to capture media content in compliance with media specifications in accordance with one or more implementations.

FIG. 3a depicts a scenario 300a for enabling user interaction for determining how to capture media content in compliance with media specifications in accordance with one or more implementations. In the scenario 300a a capture adjustment GUI 302 is presented on the computing device 102, such as part of the guidance query 216 implemented by the media capture module 120. Generally, the capture adjustment GUI 302 includes information indicating that a particular application is requesting media input (e.g., a photo) and that current capture settings (e.g., for a camera 122) are too large for media specifications of the identified application. The capture adjustment GUI 302 also indicates that media capture settings are automatically adjustable by the system (e.g., the computing device 102) or a user can provide manual guidance for adjusting the media capture settings.

Accordingly, the capture adjustment GUI 302 includes a selectable control 304 that is selectable to cause the system to automatically adjust media capture settings to comply with media specifications of the application, and a selectable control 306 that is selectable to enable a user to provide manual guidance for adjusting media capture settings. For instance, in response to user selection of the selectable control 304 the system utilizes an automated process to adjusting media capture settings to capture an instance of media content that complies with media specifications of the identified application. As described in the system 200a, for example, the media capture module 120 communicates media specifications to a media capture device 110 and the media capture device 110 captures an instance of media content that complies with the media specifications. In another example, in response to a selection of the selectable control 306 a user is presented with an opportunity to provide guidance for adjusting media capture settings of a media capture device 110. As described in the system 200a, for example, user guidance is received and communicated along with media specifications to a media capture device 110, and the media capture device 110 captures an instance of media content based on the media specifications and the user guidance.

Figure 3B:
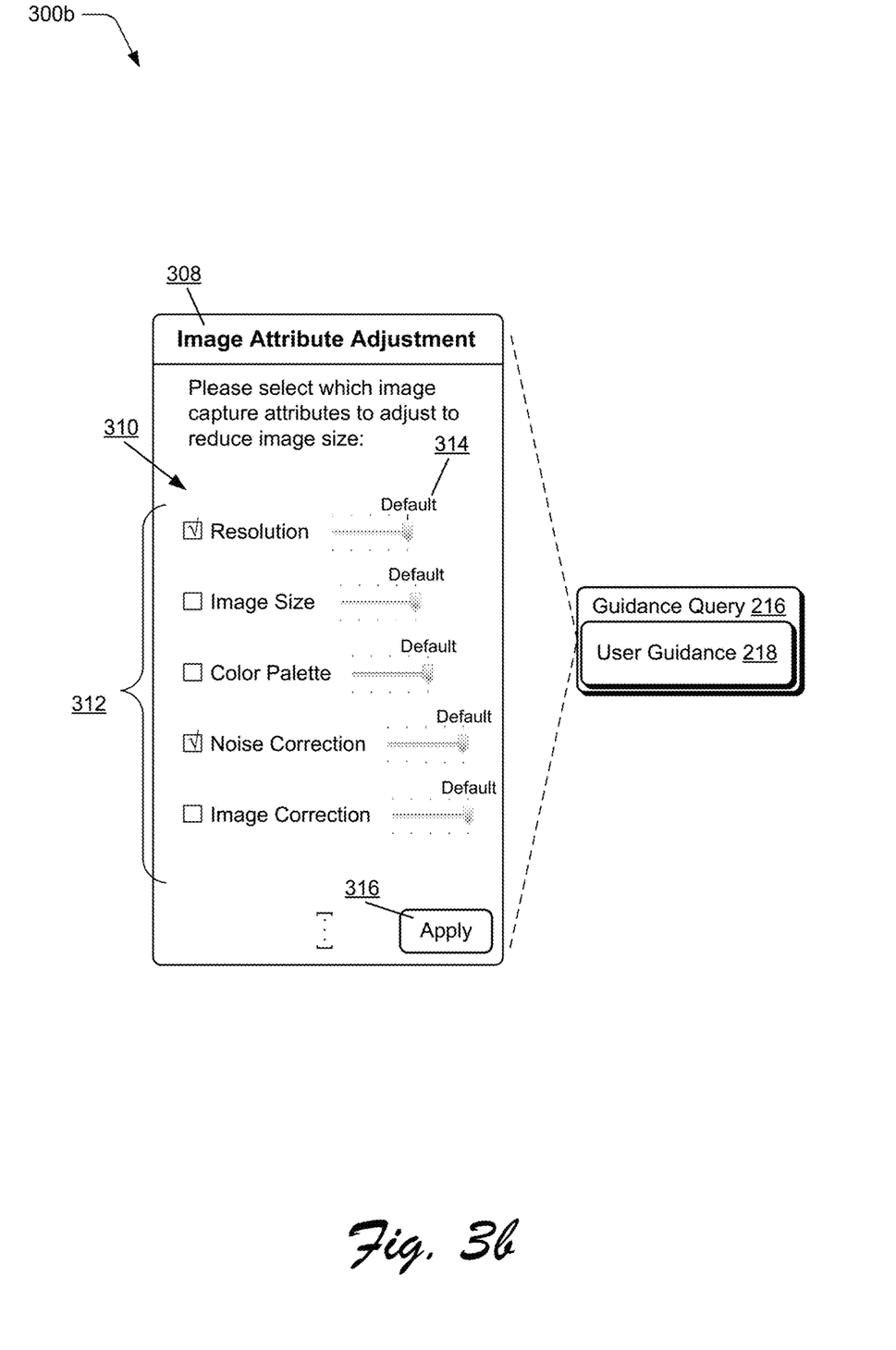
FIG. 3*b* depicts a scenario for receiving user guidance for adjusting media capture settings utilizing user guidance in accordance with one or more implementations.

FIG. 3b depicts a scenario 300b for receiving user guidance for adjusting media capture settings utilizing user guidance in accordance with one or more implementations. In the scenario 300b an attribute adjustment GUI 308 is presented on the computing device 102, such as part of the guidance query 216 implemented by the media capture module 120. For instance, in response to user selection of the selectable control 306, the media capture module 120 generates and presents the attribute adjustment GUI 308. The attribute adjustment GUI 308 prompts the user to select media capture attributes to adjust and includes an attribute region 310 with different media capture attributes 312 that are adjustable via user input. In this particular example the media capture pertains to visual media and thus the media capture attributes 312 pertain to different visual media attributes.

Generally, each media capture attribute 312 is selectable to indicate that the attribute is to be adjusted to comply with media capture specifications of an application. Further, each media capture attribute 312 includes an adjustment control 314 that is configured to receive user input to indicate a relative amount of adjustment to be applied to the particular media capture attribute 312. For instance, the "Resolution" media capture attribute 312 is selectable to indicate that image resolution is to be adjusted, and the adjustment control 314 is manipulable to indicate a relative amount of adjustment to be applied to image resolution as part of an image capture. In this particular example the adjustment control 314 is implemented as a slider control with a "Default" position representing a default image capture resolution for a camera 122. Further, a user can adjust the adjustment control 314 to reduce image capture resolution from the default resolution. Accordingly, the user can select instances and combinations of the media capture attributes 312 and specify relative amounts of adjustment to be applied to selected media capture attributes.

The attribute adjustment GUI 308 also includes a selectable control 316 that is selectable to apply selected media capture attributes 312 as part of adjusting media capture attributes for complying with media specifications for an application. For instance, selecting the selectable control 316 causes the media capture module 120 to generate the user guidance 218 for use by a media capture device 110 for capturing an instance of media content in compliance with a particular set of media specifications. In an image capture scenario, for example, a camera 122 receives the user guidance 218 and adjusts media capture attributes 312 identified in the user guidance, e.g., the media capture attributes 312 selected from the attribute adjustment GUI 308.

For instance, consider a scenario where a user selects the "Resolution" and "Noise Correction" media capture attributes. Based on this selection the user guidance 218 indicates that image capture resolution and noise correction utilized for image capture are to be adjusted (e.g., reduced) to comply with media specifications for an instance of visual media. Accordingly, as part of capturing an image, a camera 122 adjusts image resolution and noise correction utilized for image capture to comply with media specifications. Further, the image resolution and noise correction can be adjusted relatively based an adjustment amount specified via adjustment of a respective adjustment control 314.

Figure 4:
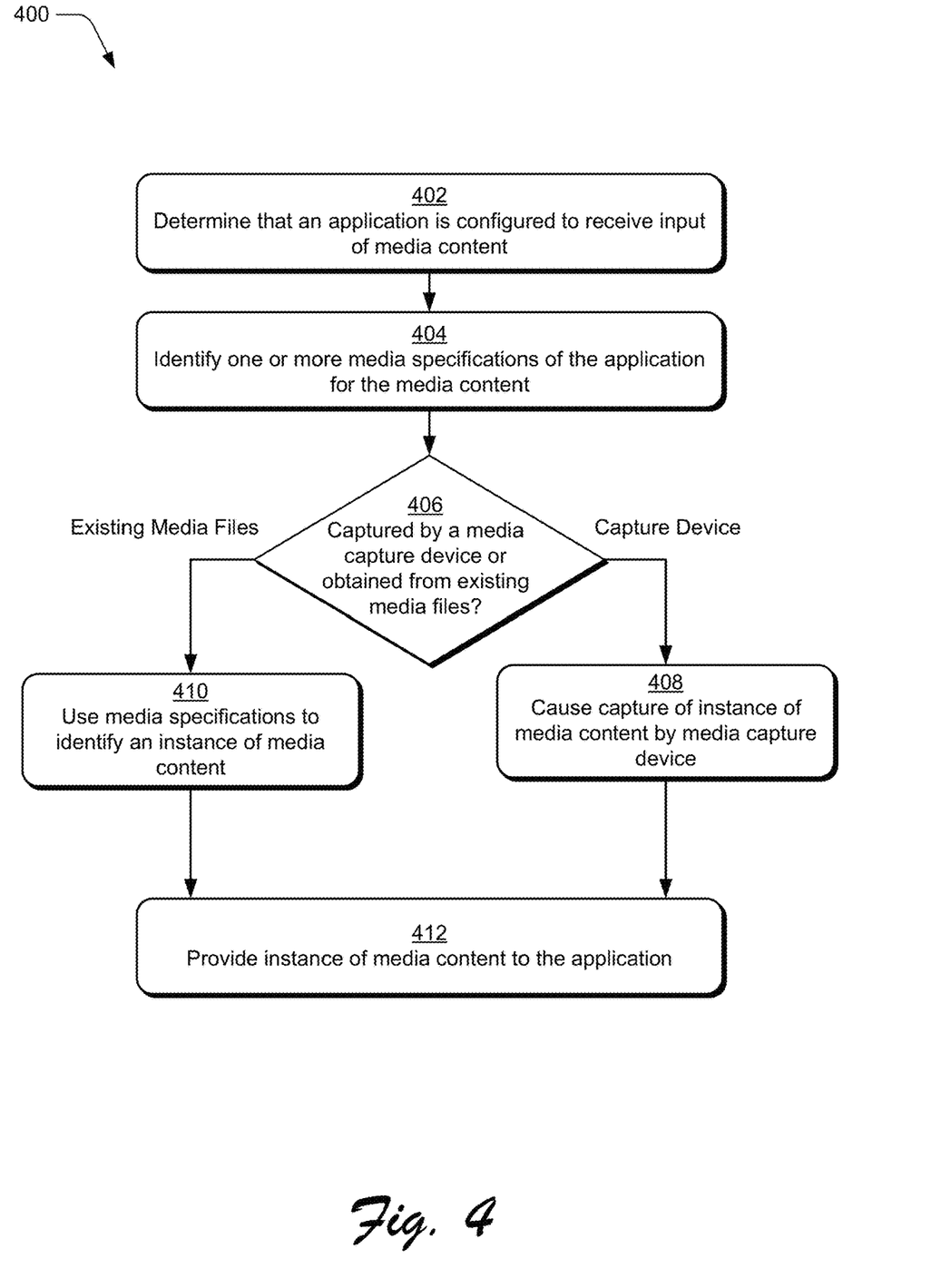
FIG. 4 illustrates a flow chart depicting an example method for obtaining media content based on media specifications in accordance with one or more implementations.

FIG. 4 illustrates a flow chart depicting an example method 400 for obtaining media content based on media specifications in accordance with one or more implementations. At 402 it is determined that an application is configured to receive input of media content via a computing device. The media capture module 120, for instance, determines that an application 118 is in a state to receive input of an instance of media content and/or multiple instances of media content. Generally, various states and/or events can indicate that an application is configured to receive input of media content, such as an indication that the application invokes (e.g., launches) a media capture device to obtain media content, an indication that an application GUI for the application includes a prompt (e.g., a visual prompt) to provide input of media content, a notification from the application that it is configured to receive input of media content, and so forth.

At 404 prior to obtaining the media content on the computing device, media specifications of the application are identified for the media content. The application, for example, communicates data that identifies specifications for providing media content input to the application. In at least one implementation the media capture module 120 queries the application for media specifications and the application replies with relevant media specifications, such as based on a type of media content to be input to the application. Alternatively or additionally the media capture module 120 inspects attributes of the application to identify the media specifications. For instance, the media capture module 120 analyzes a GUI for the application to identify a media type and media specifications for providing input of an instance of media content. The application GUI, for example, includes a visual prompt that identifies the media specifications. As yet another example the application broadcasts its media specifications independently of a query from the media capture module 120.

Generally, the media specifications include various criteria (e.g., constraints) for media input to the application, such as a maximum file size, a maximum image size, a maximum playback length, target aspect ratio, media encoding type, and other media attributes. Alternatively or additionally the media specifications include subject matter to be included in media content, such as image features (e.g., visual objects included in images), audio features, and so forth.

At 406 it is determined whether an instance of media content is to be captured by a media capture device or obtained from a group of existing media files. Generally, various state conditions can be considered in determining whether to capture the instance of media content via a media capture device 110 or to search the media files 112 for the instance of media content. For example, in a scenario where an application and/or a user invokes a media capture device 110, this indicates that an instance of media content is to be captured by the media capture device 110. In scenario where an application and/or a user does not invoke a media capture device 110, and/or when a media capture device 110 is not available (e.g., is offline and/or non-functional), an instance of media content can be obtained from the media files 112.

If the instance of media content is to be captured by a media capture device ("Capture Device") at 408 an instance of the media content is caused to be captured by a media capture device of the computing device based on the one or more media specifications. The media specifications, for example, are communicated to a media capture device 110 (e.g., by an application 118 and/or the media capture module 120) and the media capture device 110 captures an instance of media content that complies with the media specifications. For instance, in a visual media scenario, a camera 122 captures an instance of visual media (e.g., a digital image, digital video) that corresponds to the media specifications. As an example, where the media specifications specify a maximum file size, attributes of visual media are modified (e.g., reduced) from default image capture settings to enable captured visual media to not exceed the maximum file size. In another example wherein the media content is audio content, attributes of the audio content are modified to enable captured audio content to not exceed a maximum file size.

If the instance of media content is to be obtained from a group of existing media files ("Existing Media Files") at 410 the media specifications are utilized to identify an instance of media content. The media capture module 120, for example, communicates the media specifications to the media navigator module 114 and the media navigator module 114 utilizes the media specifications to search the media files 112 and identify an instance of media content of a content type requested by the application and that complies with the media specifications.

In at least one implementation the media navigator module 114 identifies an instance of media content that is modifiable to comply with media specifications. For instance, for visual media content, the media specifications specify content for an instance of visual media content, e.g., a visual object to be included in visual media content. The media specifications also specify media constraints, such as maximum file size, maximum image size, target aspect ratio, etc. Accordingly, the media navigator module 114 identifies an instance of visual media content that includes specified content but that does not comply with media constraints. In such a scenario the media editor module 116 can automatically modify the instance of visual media content to comply with the media constraints, such as by applying file compression, image cropping, aspect ratio adjustment, etc., to generate a modified version of the visual media content that complies with media constraints specified by the media specifications.

In a scenario where audio media content is to be obtained, media specifications can specify content for audio media content (e.g., user-specific voice content, keywords, content creation date, etc.) and media constraints for the audio content such as maximum file size, maximum playback length, maximum bitrate, etc. Accordingly, the media navigator module 114 identifies an instance of audio media content that includes specified audio content but that does not comply with media constraints. In such a scenario the media editor module 116 can automatically modify the instance of audio media content to comply with the media constraints, such as by applying file compression, modifying (e.g., reducing) playback length, modifying (e.g., reducing) bitrate, etc., to generate a modified version of the audio media content that complies with media constraints specified by the media specifications.

Generally, the process of identifying the instance of media content and/or modifying the instance of media content to comply with media constraints can be performed automatically without user interaction to select an instance of media content and/or modify the instance of media content.

At 412 the instance of media content is provided to the application. For instance, in a scenario where the instance of media content is captured by a media capture device 110, the instance of media content is communicated from the media capture device 110 to the application, e.g., via the media capture module 120. In another example, where the instance of media content is identified as part of a search of the media files 112, the media navigator module 114 communicates the instance of media content to the application, e.g., via the media capture module 120.

Figure 5:
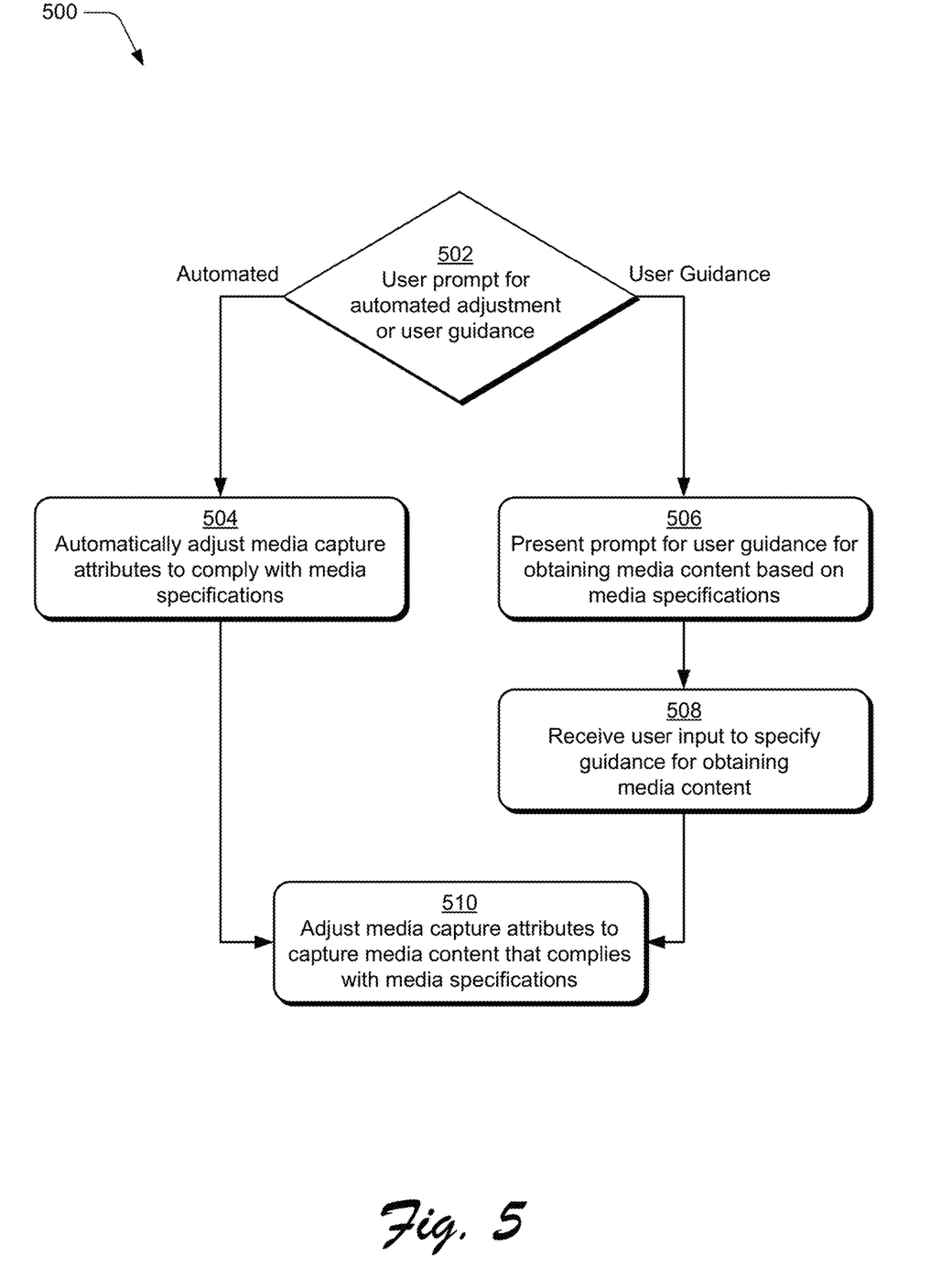
FIG. 5 illustrates a flow chart depicting an example method for utilizing user guidance for obtaining media content in accordance with one or more implementations.

FIG. 5 illustrates a flow chart depicting an example method 500 for utilizing user guidance for obtaining media content in accordance with one or more implementations. The method 500, for example, is implemented in conjunction with the method 400 for obtaining an instance of media content for an application. At 502 a user prompt is presented querying a user whether to utilize automated adjustment of media capture attributes or to enable user guidance for adjusting media capture attributes. The media capture module 120, for instance, presents a user with the options to allow the system to automatically adjust media capture attributes to comply with media specifications for an application or to enable the user to provide guidance for adjusting media capture attributes. See, for example, the capture adjustment GUI 302 described above with reference to FIG. 3*a*.

If user input is received instructing to utilize automated adjustment of media capture attributes ("Automated"), at 504 media capture attributes are automatically adjusted to comply with media specifications. The media capture module 120 and/or a media capture device 110, for instance, automatically selects which media capture attributes to adjust and a relative amount of adjustment to apply to comply with media specifications, e.g., media specifications for a particular application.

If user input is received instructing to utilize user guidance for adjusting media capture attributes ("User Guidance"), at 506 a prompt is presented for user guidance for obtaining an instance of media content based on media specifications. For instance, in a scenario where an instance of media content is to be captured via a media capture device, a user is prompted for guidance in applying media specifications for capturing media content. In at least one implementation, the user is presented with different selectable media attributes and the user selects a particular attribute and/or set of attributes to adjust in conjunction with media capture. Further, in addition to presenting adjustable attributes, the user can be presented with the option of specifying an amount of attribute adjustment to be applied. One example interface for enabling user guidance to be received is described above with reference to the scenario 300*b*.

At 508 user input to specify guidance for obtaining an instance of media content is received. A user, for instance, identifies different media attributes to be adjusted and can optionally specify a relative amount of adjustment for particular selected attributes. See, for example, the attribute adjustment GUI 308 described above with reference to FIG. 3*b*. At 510 media capture attributes are adjusted to capture an instance of media content that complies with media specifications. For instance, in a scenario where automated adjustment is specified, a media capture device 110 automatically applies adjusted attributes and captures an instance of media content based on the adjusted attributes to comply with media specification. In another example, where user guidance is specified, a media capture device 110 utilizes the user guidance to adjust media capture attributes to capture an instance of media content that complies with the media specifications.

While the method 500 is discussed with reference to either automated adjustment or user guidance for attribute adjustment, at least some implementations utilize a combination of automated adjustment and user guidance for adjusting media capture attributes to comply with media specifications. For instance, in a scenario where utilizing user guidance would result in an instance of media content that does not comply with media specifications, the media capture module 120 and/or a media capture device 110 also utilizes automated adjustment to further adjust media capture attributes to comply with media specifications.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 6:
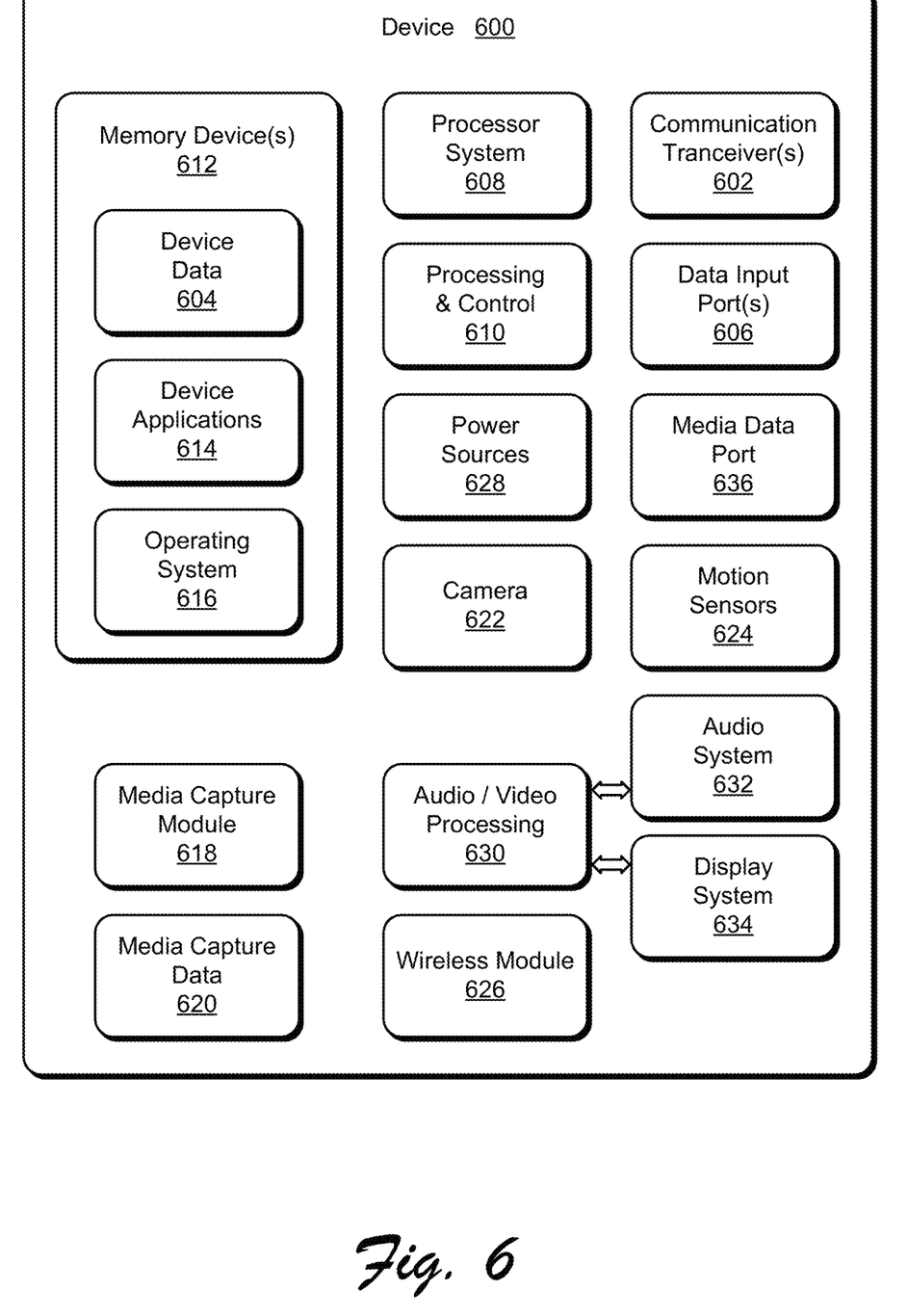
FIG. 6 illustrates various components of an example device in which aspects of media capture based on media specifications can be implemented.

FIG. 6 illustrates various components of an example device 600 in which aspects of media capture based on media specifications can be implemented. The example device 600 can be implemented as any of the devices described with reference to the previous FIGS. 1-5, such as any type of mobile device, mobile phone, mobile device, wearable device, tablet, computing, communication, entertainment, gaming, media playback, and/or other type of electronic device. For example, the computing device 102 as shown and described with reference to FIGS. 1-5 may be implemented as the example device 600.

The device 600 includes communication transceivers 602 that enable wired and/or wireless communication of device data 604 with other devices. The device data 604 can include any of device identifying data, device location data, wireless connectivity data, and wireless protocol data. Additionally, the device data 604 can include any type of audio, video, and/or image data. Example communication transceivers 602 include wireless personal area network (WPAN) radios compliant with various IEEE 602.15 (Bluetooth™) standards, wireless local area network (WLAN) radios compliant with any of the various IEEE 602.11 (Wi-Fi™) standards, wireless wide area network (WWAN) radios for cellular phone communication, wireless metropolitan area network (WMAN) radios compliant with various IEEE 602.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on. Computer-readable storage memory 612 represents media and/or devices that enable persistent and/or non-transitory storage of information in contrast to mere signal transmission, carrier waves, or signals per se. Computer-readable storage memory 612 do not include signals per se or transitory signals.

In this example, the device 600 includes a media capture module 618 that implements aspects of media capture based on media specifications and may be implemented with hardware components and/or in software as one of the device applications 614. For example, the media capture module 618 can be implemented as the media capture module 120 described in detail above. In implementations, the media capture module 618 may include independent processing, memory, and logic components as a computing and/or electronic device integrated with the device 600. The device 600 also includes media capture data 620 for implementing aspects of media capture based on media specifications and may include data from the media capture module 618, such as media specifications for different instances of applications 118.

In this example, the example device 600 also includes a camera 622 and motion sensors 624, such as may be implemented in an inertial measurement unit (IMU). The motion sensors 624 can be implemented with various sensors, such as a gyroscope, an accelerometer, and/or other types of motion sensors to sense motion of the device. The various motion sensors 624 may also be implemented as components of an inertial measurement unit in the device.

The device 600 also includes a wireless module 626, which is representative of functionality to perform various wireless communication tasks. For instance, for the computing device 102, the wireless module 626 can be leveraged to scan for and detect wireless networks, as well as negotiate wireless connectivity to wireless networks for the computing device 102. The device 600 can also include one or more power sources 628, such as when the device is implemented as a mobile device. The power sources 628 may include a charging and/or power system, and can be implemented as a flexible strip battery, a rechargeable battery, a charged super-capacitor, and/or any other type of active or passive power source.

The device 600 also includes an audio and/or video processing system 630 that generates audio data for an audio system 632 and/or generates display data for a display system 634. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 636. In implementations, the audio system and/or the display system are integrated components of the example device. Alternatively, the audio system and/or the display system are external, peripheral components to the example device.

Although implementations of media capture based on media specifications have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a method, including: determining that an application is configured to receive input of media content via a computing device; identifying, prior to capturing the media content on the computing device, one or more media specifications of the application for the media content; causing an instance of the media content to be captured by a media capture device of the computing device based on the one or more media specifications; and providing the instance of media content to the application.

In some aspects, the techniques described herein relate to a method, wherein the determining that the application is configured to receive input of media content includes determining that the application invokes the media capture device of the computing device for capturing the instance of media content.

In some aspects, the techniques described herein relate to a method, wherein the identifying the one or more media specifications includes receiving data from the application that specifies the one or more media specifications.

In some aspects, the techniques described herein relate to a method, wherein the identifying the one or more media specifications includes analyzing a graphical user interface for the application to determine that the graphical user interface identifies the one or more media specifications.

In some aspects, the techniques described herein relate to a method, wherein the one or more media specifications include a maximum media file size for media content, and wherein the causing the instance of media to be captured by the media capture device of the computing device based on the one or more media specifications includes communicating an instruction to the media capture device to capture the instance of media content with a file size that is no greater than the maximum media file size.

In some aspects, the techniques described herein relate to a method, wherein: the determining that the application is configured to receive input of media content includes determining that the application is configured to receive input of visual media content, the one or more media specifications include a maximum file size for visual media content, and the causing the instance of media to be captured by the media capture device of the computing device based on the one or more media specifications includes communicating an instruction to the media capture device to capture the instance of media content as an instance of visual media content with a file size that is no greater than the maximum file size.

In some aspects, the techniques described herein relate to a method, wherein: the determining that the application is configured to receive input of media content includes determining that the application is configured to receive input of audio media content, the one or more media specifications include a maximum file size for audio media content, and the causing the instance of media to be captured by the media capture device of the computing device based on the one or more media specifications includes communicating an instruction to the media capture device to capture the instance of media content as an instance of audio media content with a file size that is no greater than the maximum file size.

In some aspects, the techniques described herein relate to a method, further including: detecting user interaction with the computing device to invoke the media capture device; and communicating, in response to the detecting the user interaction, the one or more media specifications to the media capture device to enable the instance of the media content to be captured by the media capture device of the computing device based on the one or more media specifications.

In some aspects, the techniques described herein relate to a method, further including receiving user input to specify user guidance for adjusting one or more media capture attributes of the media capture device, wherein the causing the instance of media content to be captured includes causing the instance of the media content to be captured by a media capture device of the computing device based on the one or more media specifications and the user guidance.

In some aspects, the techniques described herein relate to a computing device including: one or more media capture devices; and a media capture module implemented at least in part in hardware of the computing device to: determine that an application graphical user interface of an application is configured to receive input of media content; identify, prior to capture of the media on the computing device, one or more media specifications of the application for the media content; cause an instance of the media content to be captured by the one or more media capture devices based on the one or more media specifications; and cause the instance of media content to be provided to the application graphical user interface.

In some aspects, the techniques described herein relate to a computing device, wherein to determine that the application graphical user interface on the computing device is configured to receive input of media content includes to determine that the application invokes the one or more media capture devices.

In some aspects, the techniques described herein relate to a computing device, wherein to determine that the application graphical user interface on the computing device is configured to receive input of media content includes to determine that the application graphical user interface includes a prompt to provide media content.

In some aspects, the techniques described herein relate to a computing device, wherein to identify the one or more media specifications of the application includes to receive data from the application that identifies the one or more media specifications.

In some aspects, the techniques described herein relate to a computing device, wherein to cause an instance of the media content to be captured by the one or more media capture devices based on the one or more media specifications includes to communicate the one or more media specifications to the one or more media capture devices.

In some aspects, the techniques described herein relate to a computing device, wherein the media capture module is implemented to communicate the one or more media specifications to the one or more media capture devices independent of user interaction.

In some aspects, the techniques described herein relate to a computing device, wherein to cause an instance of the media content to be captured by the one or more media capture devices based on the one or more media specifications includes to communicate the one or more media specifications to the one or more media capture devices to cause the one or more media capture devices to modify one or more default media capture settings for capturing the instance of media content based on the one or more media specifications.

In some aspects, the techniques described herein relate to a system including: one or more processors; and one or more computer-readable storage media storing instructions that are executable by the one or more processors to: determine that an application is configured to receive input of media content of a particular media type; identify one or more media specifications of the application for the media content; cause the media type and the one or more media specifications to be utilized by the system to identify an instance of the media content of the particular media type and that complies the one or more media specifications; and cause the instance of media content to be provided to the application.

In some aspects, the techniques described herein relate to a system, wherein to identify the one or more media specifications of the application includes to receive a data communication from the application identifying the one or more media specifications.

In some aspects, the techniques described herein relate to a system, wherein to cause the media type and the one or more media specifications to be utilized by the system to identify an instance of the media content includes to cause an automated search of a set of media content based on the one or more media specifications, the automated search performed automatically in response to receiving the data communication from the application identifying the one or more media specifications.

In some aspects, the techniques described herein relate to a system, wherein the one or more media specifications include a file size constraint specified by the application and an indication of subject matter to be included in the media content.

The invention claimed is:

1. A method, comprising:
   determining that an application is configured to receive input of media content via a computing device;
   identifying, prior to capturing the media content on the computing device, one or more media specifications of the application for the media content;
   causing an instance of the media content to be captured by a media capture device of the computing device based on the one or more media specifications; and
   providing the instance of media content to the application including communicating the instance of media content from the media capture device to the application, wherein:
     said determining that the application is configured to receive input of media content comprises determining that the application is configured to receive input of one or more of visual media content or audio media content,
     the one or more media specifications comprise a maximum file size for one or more of visual media content or audio media content, and
     said causing the instance of media to be captured by the media capture device of the computing device based on the one or more media specifications comprises communicating an instruction to the media capture device to capture the instance of media content as one or more of a single instance of visual media content or a single instance of audio media content with a file size that is no greater than the maximum file size.

2. The method as recited in claim 1, wherein said determining that the application is configured to receive input of media content comprises determining that the application invokes the media capture device of the computing device for capturing the instance of media content.

3. The method as recited in claim 1, wherein said identifying the one or more media specifications comprises receiving data from the application that specifies the one or more media specifications.

4. The method as recited in claim 1, wherein said identifying the one or more media specifications comprises analyzing a graphical user interface for the application to determine that the graphical user interface identifies the one or more media specifications.

5. The method as recited in claim 1, further comprising:
   detecting user interaction with the computing device to invoke the media capture device; and
   communicating, in response to said detecting the user interaction, the one or more media specifications to the media capture device to enable the instance of the media content to be captured by the media capture device of the computing device based on the one or more media specifications.

6. The method as recited in claim 1, further comprising receiving user input to specify user guidance for adjusting one or more media capture attributes of the media capture device, wherein said causing the instance of media content to be captured comprises causing the instance of the media content to be captured by a media capture device of the computing device based on the one or more media specifications and the user guidance.

7. The method as recited in claim 1, wherein the one or more media specifications comprise a media capture resolution that is reduced from a default media capture resolution of the media capture device.

8. The method as recited in claim 7, wherein said causing the instance of media to be captured by the media capture device of the computing device comprises causing the media capture device to reduce the default capture resolution prior to capturing the instance of media content.

9. A computing device comprising:
   one or more media capture devices; and
   a media capture module implemented at least in part in hardware of the computing device to:
     determine that an application graphical user interface of an application is configured to receive input of media content;
     identify, prior to capture of the media on the computing device, one or more media specifications of the application for the media content;
     cause an instance of the media content to be captured by the one or more media capture devices based on the one or more media specifications, including to communicate an instruction to the one or more media capture devices to capture the instance of media content according to the one or more media specifications, and wherein the one or more media specifications include a media capture resolution that is different than a default media capture resolution of the one or more media capture devices;
     receive, from the one or more media capture devices, the instance of media content that conforms with the one or more media specifications; and
     cause the instance of media content to be communicated from the one or more media capture devices to the application graphical user interface.

10. The computing device as recited in claim 9, wherein to determine that the application graphical user interface on the computing device is configured to receive input of media content comprises to determine that the application invokes the one or more media capture devices.

11. The computing device as recited in claim 9, wherein to determine that the application graphical user interface on the computing device is configured to receive input of media content comprises to determine that the application graphical user interface includes a prompt to provide media content.

12. The computing device as recited in claim 9, wherein to identify the one or more media specifications of the application comprises to receive data from the application that identifies the one or more media specifications.

13. The computing device as recited in claim 9, wherein the media capture module is implemented to communicate the one or more media specifications to the one or more media capture devices independent of user interaction.

14. The computing device as recited in claim 9, wherein the media capture resolution comprises an image capture resolution.

15. A system comprising:
   one or more processors; and
   one or more computer-readable storage media storing instructions that are executable by the one or more processors to:
     determine that an application is configured to receive input of media content of a particular media type;
     identify one or more media specifications of the application for the media content;
     cause the media type and the one or more media specifications to be utilized by the system to identify an instance of the media content of the particular media type and that complies the one or more media specifications, including to cause an automated search of a stored set of media content based on the one or more media specifications to obtain the instance of media content from the stored set of media content, said automated search performed automatically in response to determining that the application is configured to receive input of media content of the particular media type; and cause the instance of media content to be communicated from the stored set of media content to the application.

16. The system of claim 15, wherein to identify the one or more media specifications of the application comprises to receive a data communication from the application identifying the one or more media specifications.

17. The system of claim 15, wherein the one or more media specifications comprise a file size constraint specified by the application and an indication of subject matter to be included in the media content.

18. The system of claim 17, wherein the indication of subject matter to be included in the media content comprises an indication of a visual object to be included in the media content.

19. The system of claim 15, wherein to determine that the application is configured to receive input of media content of the particular media type comprises to detect that the application presents a media prompt that is operable to receive interaction for input of the instance of media content.

20. The system of claim 15, wherein to identify the one or more media specifications of the application for the media content, the instructions are executable by the one or more processors to perform computer-implemented text recognition on a graphical user interface of the application to identify the one or more media specifications.

* * * * *